Sept. 22, 1942.    C. J. CARLSON    2,296,501
CULTIVATOR APPLIANCE FOR TRACTORS
Filed July 21, 1941    3 Sheets-Sheet 3

Inventor
CLARENCE J. CARLSON,
By Clarence A. O'Brien
Attorney

Patented Sept. 22, 1942

2,296,501

UNITED STATES PATENT OFFICE 2,296,501

CULTIVATOR APPLIANCE FOR TRACTORS

Clarence J. Carlson, Marshalltown, Iowa

Application July 21, 1941, Serial No. 403,423

1 Claim. (Cl. 97—47)

This invention relates to new and useful improvements in cultivator attachments especially adapted for power-driver tractors.

The principal object of the present invention is to provide a cultivator attachment for the front axles of present types of Ford tractors.

Another important object of the invention is to provide a cultivator attachment of the character stated which will at all times be clearly visible to the operator of the tractor.

Another important object of the invention is to provide a front cultivator which can be controlled in response to the controlled position of a rear cultivator.

Other objects and advantages of the invention will become apparent to the reader of the following specification.

Figure 1:
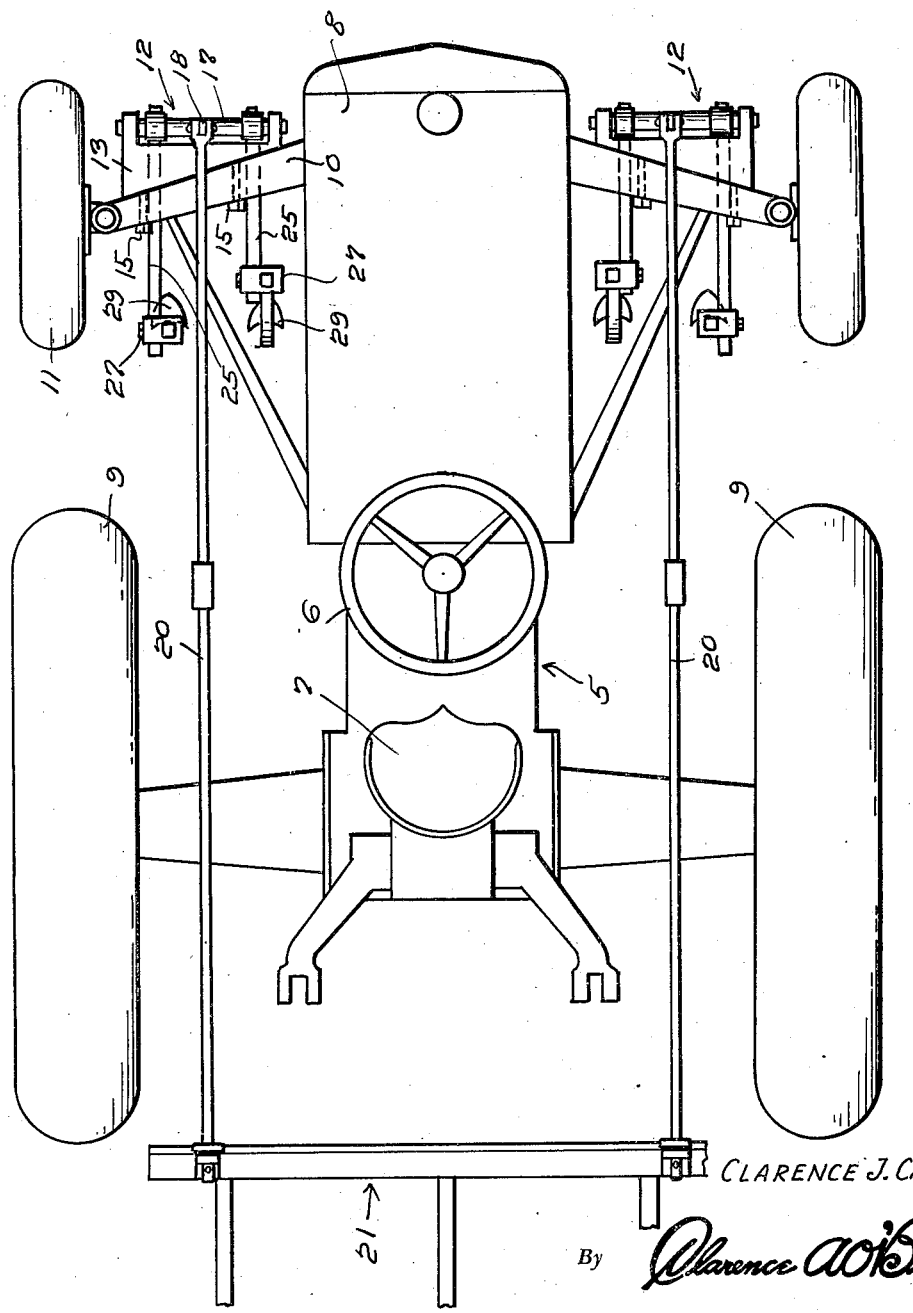
Figure 1 represents a top plan view of a tractor shown equipped with the present invention.
Figure 2:
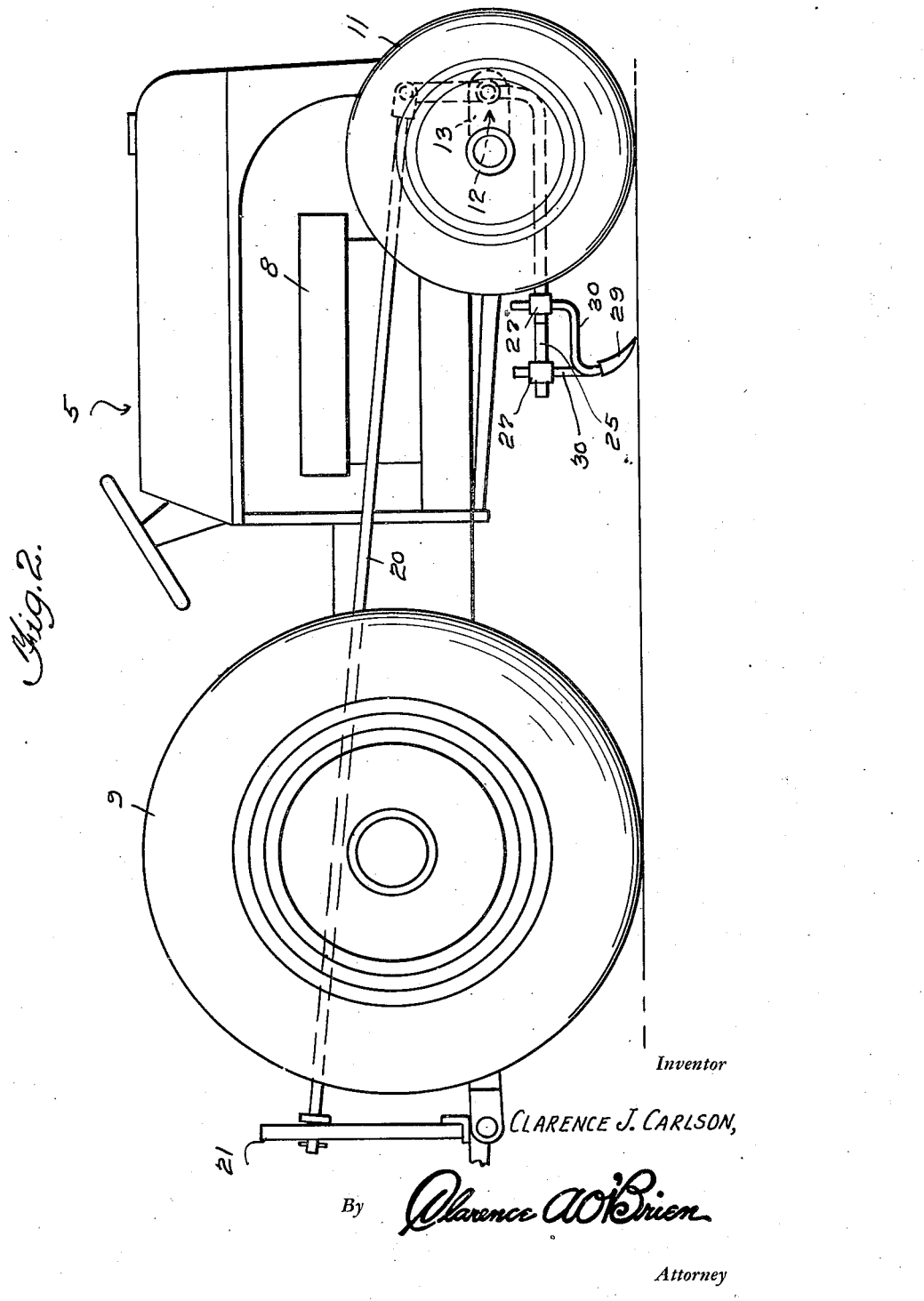
Figure 2 is a side elevational view of a tractor with the present invention installed thereon.
Figure 3:
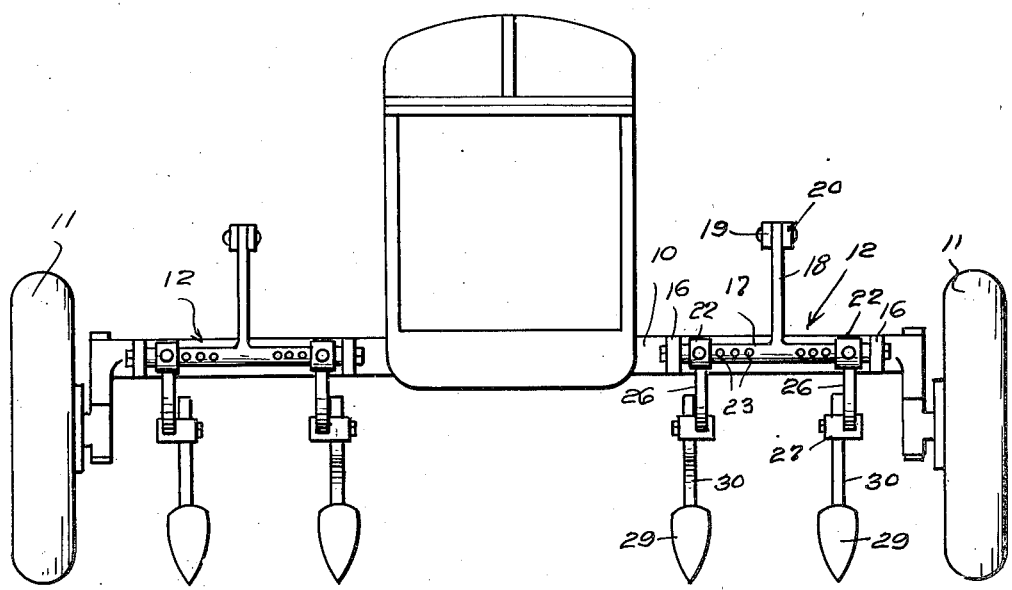
Figure 3 is a front elevational view of a tractor showing the present invention.

Referring to the drawings wherein like numerals designate like parts, it can be seen that numeral 5 generally refers to a conventional Ford tractor which has the usual steering wheel 6, seat 7 and plant 8 or supplying power to the rear wheels 9, 9.

This type of tractor has an axle 10 equipped at its ends with steering wheels 11.

In carrying out the present invention, at each side of the power plant 8 and secured to an end portion of the axle 10 is a unit generally referred to by numeral 12 of the present invention.

Each of these units consists of an elongated tapered block 13 which goes against the forward side of the axle 10 and is tapered so as to make up for the diverged relationship of the end portions of the axle 10, that is, so that the forward sides of the blocks 13 are substantially aligned with each other.

Each of these blocks 13 has rearwardly extending and threaded members 14 which extend through openings in the axle 10 and are equipped with nuts 15. Ears 16, 16 extend forwardly from the blocks 13 and have end portions of a shaft 17 journaled therethrough. An arm 18 rises from the shaft 17 and is pivotally connected as at 19 to the forward end of a rod 20 which extends from a conventional cultivator mechanism generally referred to by numeral 21 (see Figure 1).

Figure 4:
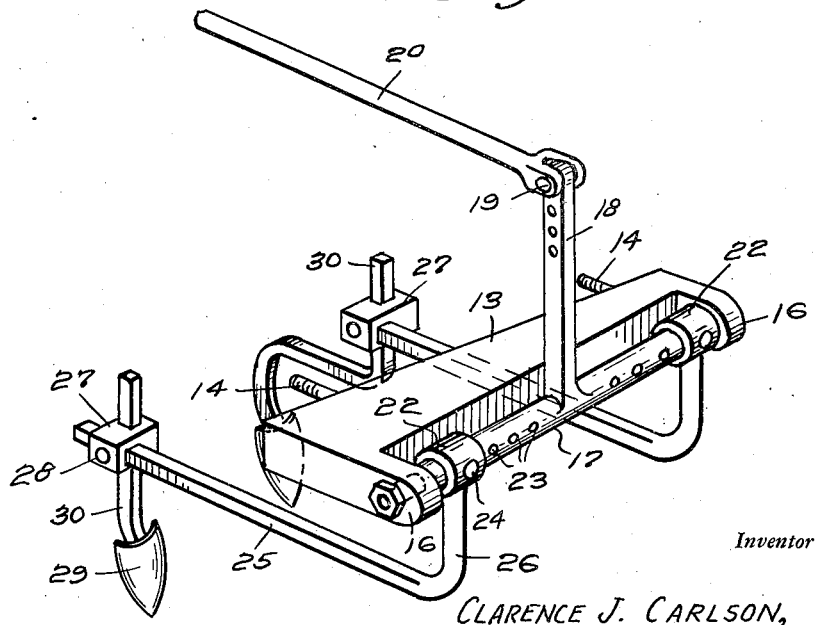
Figure 4 is a perspective view showing one of the side units of the invention.

Collars 22, 22 are located on the shaft 17 and as is shown in Figure 4, the shaft 17 has a plurality of longitudinally spaced and threaded openings 23 for receiving adjusting screws 24 on the collars 22, that is, to the end that the collars can be adjusted to various points on the shaft 17.

Elongated square bars 25 have their forward ends disposed upwardly as at 26 and are formed to be welded or otherwise joined with the collars 22.

Blocks 27 are slidably disposed on the squared bars 25 and are held in place by set screws or the like 28. Cultivator shovels 29 provided with upstanding shanks 30 have these shanks vertically disposed and adjustable through the blocks 27.

It can be seen that the rods 20 extend to the rear cultivator mechanism 21 so that whenever the rear cultivator mechanism is lifted, the front units 12 are likewise lifted to the end that the tractor can travel over paved streets.

By having the cultivator attachment thus mounted on the front axles, the wheels act as gauge wheels allowing the shovels to follow the ground regardless of its unevenness. This particular mounting of the cultivator attachment allows for quick action in dodging staggered corn, etc.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A cultivator attachment for the front axles of tractors comprising a block having forwardly extending ears, a shaft disposed between the ears, a collar adjustable on the shaft, a bar extending from the collar, and an adjustable cultivator element carried by the bar.

CLARENCE J. CARLSON.